United States Patent
Hoffman et al.

(10) Patent No.: US 12,191,785 B2
(45) Date of Patent: Jan. 7, 2025

(54) SYSTEM AND METHOD FOR INERTIAL COMPENSATION IN A MOTOR DRIVE

(71) Applicant: Rockwell Automation Technologies, Inc., Mayfield Heights, OH (US)

(72) Inventors: Jonathan D. Hoffman, Milwaukee, WI (US); Adam M. Shea, Fox Point, WI (US); Robert J. Miklosovic, Chardon, OH (US)

(73) Assignee: Rockwell Automation, Technologies, Inc., Mayfield Heights, OH (US)

( * ) Notice: Subject to any disclaimer, the term of this patent is extended or adjusted under 35 U.S.C. 154(b) by 157 days.

(21) Appl. No.: 18/107,827

(22) Filed: Feb. 9, 2023

(65) Prior Publication Data
US 2024/0275321 A1 Aug. 15, 2024

(51) Int. Cl.
*H02P 23/14* (2006.01)
*H02P 23/20* (2016.01)
*H02P 27/08* (2006.01)

(52) U.S. Cl.
CPC .............. *H02P 23/14* (2013.01); *H02P 27/08* (2013.01)

(58) Field of Classification Search
CPC ........... H02P 23/14; H02P 23/20; H02P 27/08
See application file for complete search history.

(56) References Cited

U.S. PATENT DOCUMENTS

| | | | | |
|---|---|---|---|---|
| 7,141,946 B2* | 11/2006 | Rehm | ................ | H02P 23/0004 318/560 |
| 8,872,463 B2* | 10/2014 | Sonoda | ................ | H02P 21/143 318/568.22 |
| 9,998,053 B2* | 6/2018 | Miklosovic | ............. | H02P 23/14 |
| 10,483,902 B1* | 11/2019 | Sizov | ...................... | H02P 29/50 |

(Continued)

FOREIGN PATENT DOCUMENTS

EP 3376664 A1 9/2018

OTHER PUBLICATIONS

Anonymous, "Motion System Tuning Application Technique, Original Instructions / Publication MOTION_AT005D-EN-P", dated Nov. 4, 2020, (112 pages), <https://literature.rockwellautomation.com/idc/groups/literature/documents/at/motion-at005_-en-p.pdf>.

(Continued)

*Primary Examiner* — Thai T Dinh
(74) *Attorney, Agent, or Firm* — Boyle Fredrickson S.C.

(57) ABSTRACT

A motor drive receives a position feedback signal from a position sensor operatively connected to a motor. The motor drive receives a command signal defining a desired operation of the motor. A processor in the motor drive generates an acceleration feedforward signal from the command signal and an acceleration reference signal from the command signal and the position feedback signal. The processor also generates an estimated disturbance acceleration from the acceleration reference signal. The acceleration feedforward signal is multiplied by a first gain to obtain a first product, and the estimated disturbance acceleration by a second gain (Continued)

to obtain a second product. The first and second gains are functions of first and second portions of the system inertia. A current reference signal is generated based on the first product and second products, and an output voltage to the motor is generated from the current reference signal.

20 Claims, 5 Drawing Sheets

(56) References Cited

U.S. PATENT DOCUMENTS 10,756,660 B2    8/2020    Miklosovic et al.

OTHER PUBLICATIONS

Extended European Search Report for Application No. 24155555.6 dated Jun. 10, 2024 (12 pages).
Yang, et al., "Automatic Control Loop Tuning for Permanent-Magnet AC Servo Motor Drives," IEEE Transactions on Industrial Electronics, vol. 63, No. 3, dated Mar. 1, 2016 (pp. 1499-1506).

* cited by examiner

SYSTEM AND METHOD FOR INERTIAL COMPENSATION IN A MOTOR DRIVE

BACKGROUND INFORMATION

The subject matter disclosed herein relates generally to separately utilizing motor and load inertia for improved control of a motor using a motor drive and, more specifically, to a method for utilizing both motor and load inertia in a motor drive which is compatible with automatic tuning of the motor drive.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon-controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

In order to convert the command signal to the desired output voltage, the motor drive includes a control section. The control section may vary in complexity according to the performance requirements of the motor drive. For instance, a motor drive controlling operation of a pump may only need to start and stop the pump responsive to an on/off command. The motor drive may require minimal control such as an acceleration and deceleration time for the pump. In contrast, another motor drive may control a servo motor moving, for example, one axis of a machining center or an industrial robotic arm. The motor drive may need to not only start and stop the motor but also operate at various operating speeds and/or torques or follow a position command. The motor control for a servo motor may include multiple control loops, such as a position loop, velocity loop, torque loop, current loop, or a combination thereof. Each control loop may include, for example, a proportional (P), integral (I), or derivative (D) controller, an associated controller gain value for each controller in the control loop, and may further require additional feedback and/or feed forward controller gain values. The controller may also include feedforward terms. The feedforward terms utilize the command signal and provide an input to one or more control loops corresponding to the desired command signal. Feedforward controller gains are also included to adjust the responsiveness of each feedforward path. The feedforward paths may provide high bandwidth command tracking since the feedforward paths are determined from the command signal. In order to achieve the desired operating performance of the motor, it is necessary to properly select the controllers, the associated controller gain values associated with each control loop, the desired feedforward paths, and the associated feedforward controller gains with each feedforward path.

However, selecting the controllers, feedforward paths, and associated controller gain values is a complex process. Adjustment of a controller gain value in one control loop or feedforward path may impact performance of another control loop. Although the control loops may be in parallel or in series with each other, there is typically a single input and a single output for the control system. Adjusting a controller gain value along one control loop or feedforward path impacts the performance of one or more other controller gain values. The interaction of controller gain values often requires a time and labor-intensive iterative approach to selecting gain values in order to achieve the desired level of performance.

As is further known to those skilled in the art, control of the motor is impacted by the load applied to the motor. Motors are connected to mechanical systems to control movement. Every mechanical system generates unique dynamic behavior due to unique mechanical loading on the motor. Mechanical loading is the result of a combination of mechanical system properties that are present in the mechanical system, such as inertia, friction, compliance, backlash, gravity, torque disturbances, machine-to-machine variations, manufacturing tolerances, and slow degradation over time. The effect of this mechanical loading is that the gain values for the control loop need to be calculated as functions of quantities representing each mechanical property. However, these quantities are unknown and skilled technicians must manually adjust the gain values for several control loops to achieve satisfactory performance. This manual tuning process takes time, requires a high skill level, and adds significant cost.

Historically, there have been two methods developed which attempt to provide improved performance of a motor drive. A first method is to utilize a load observer to compensate for mechanical loading in the system. The motor drive may be provided with a motor having known characteristics. The motor may be selected, for example, from a menu on the motor drive. An initial set of controller gains providing a nominal level of performance based on the motor inertia and motor performance may be loaded into the controllers as a function of the motor selected. The motor drive also includes a load observer. An initial set of gains for the observer may similarly be read from memory of the motor drive. The load observer monitors the command value and motor performance to provide an estimate of the load dynamics to the controller. This estimate is used to improve overall control of the motor. The load observer, however, is limited to the bandwidth of the observer. There is some inherent delay in determining an estimated value as it relies on measured values, performs calculations, and generates the estimate in response to execution of the calculations. The observer is typically able to identify disturbances at lower frequencies but is less able to identify disturbances at higher frequencies.

A second method for improving performance of a motor drive is to utilize an auto tuning routine. The auto tuning routine may provide a "bump" to the motor, meaning the motor is commanded to move a short distance. The motor drive monitors performance of the motor during this brief operation and determines whether the existing set of controller gains is satisfactory or if one or more of the controller gains may be modified to improve performance. If a new set of controller gains is determined, the motor drive may issue an additional bump to the motor to determine the effects of the new controller gains. This process may be iteratively repeated until an optimal set of controller gains is determined.

However, the two methods for improving performance of a motor drive are not without certain drawbacks. In particular, the two methods are commonly incompatible with each other. Both methods attempt to compensate for load dynamics. If both methods are utilized together, they often fight each other to perform the compensation. Using an autotune routine will typically identify controller gains to optimally compensate for load dynamics. However, subsequent addition of load observer may create instability in the control system as both the control loops and the load observer attempt to perform compensation. Either the observer gains or the controller gains may require detuning to reduce the performance of one system or the other, allowing the other system to provide the primary compensation for load dynamics. Detuning the controller gains or the observer gains, however, reduces the overall performance of the motor drive.

Thus, it would also be desirable to provide a motor drive that allows auto tuning of a controller gain while also allowing for an observer to compensate for load dynamics.

BRIEF DESCRIPTION

According to one embodiment of the invention, a method of controlling operation of a motor with a motor drive includes receiving a position feedback signal at the motor drive from a position sensor operatively connected to the motor and receiving a command signal at the motor drive. The command signal defines a desired operation of the motor. A processor in the motor drive generates an acceleration feedforward signal as a function of the command signal, and the processor generates an acceleration reference signal as a function of the command signal and of the position feedback signal. An estimated disturbance acceleration is generated with the processor as a function of the acceleration reference signal and the position feedback signal. The acceleration feedforward signal is multiplied by a first gain to obtain a first product, and the estimated disturbance acceleration by a second gain to obtain a second product, where the first gain is a function of a load inertia value. The first product is summed with the second product to obtain a modified acceleration reference signal, and an output voltage to control operation of the motor is generated as a function of the modified acceleration reference signal.

According to another embodiment of the invention, a method of controlling operation of a motor with a motor drive includes receiving a position feedback signal at the motor drive from a position sensor operatively connected to the motor and receiving a command signal at the motor drive. The command signal defines a desired operation of the motor. A processor in them motor drive generates an acceleration feedforward signal as a function of the command signal and an acceleration reference signal as a function of the command signal and of the position feedback signal. An estimated disturbance acceleration is generated with the processor as a function of the acceleration reference signal. The acceleration feedforward signal is multiplied by a first gain to obtain a first product, and the estimated disturbance acceleration is multiplied by a second gain to obtain a second product. The first gain is a function of a first portion of the system inertia, and the second gain is a function of a second portion of the system inertia. A current reference signal is generated as a function of the first product and the second product, and an output voltage to control operation of the motor is generated as a function of the current reference signal.

According to still another embodiment of the invention, a motor drive includes a DC bus having a positive rail and a negative rail and an inverter section having multiple switching elements. The DC bus is operable to receive a DC voltage between the positive rail and the negative rail, and each switching element is controlled by a gating signal, where the inverter section is operable to receive the DC voltage from the DC bus and provide an AC voltage at an output of the motor drive. A memory device is operable to store multiple instructions and multiple configuration parameters. The motor drive also includes a controller, a first input configured to receive a command signal corresponding to desired operation of a motor connected to the motor drive, and a second input configured to receive a position feedback signal corresponding to an angular position of the motor connected to the output of the motor drive. The controller is operable to execute the instructions to sample the position feedback signal, generate an acceleration feedforward signal as a function of the command signal, and generate an acceleration reference signal as a function of the command signal and of the position feedback signal. The controller is further operable to generate an estimated disturbance acceleration as a function of the acceleration reference and the position feedback signal and to multiply the acceleration feedforward signal by a first gain to obtain a first product, where the first gain is a function of a load inertia value. The estimated disturbance acceleration is multiplied by a second gain to obtain a second product, where the second gain is a function of a motor inertia value, and the first product is added with the second product to obtain a modified acceleration reference signal. The motor drive also includes a gate driver module operable to generate the gating signal for each of the switching elements in the inverter section as a function of the modified acceleration reference signal from the controller.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
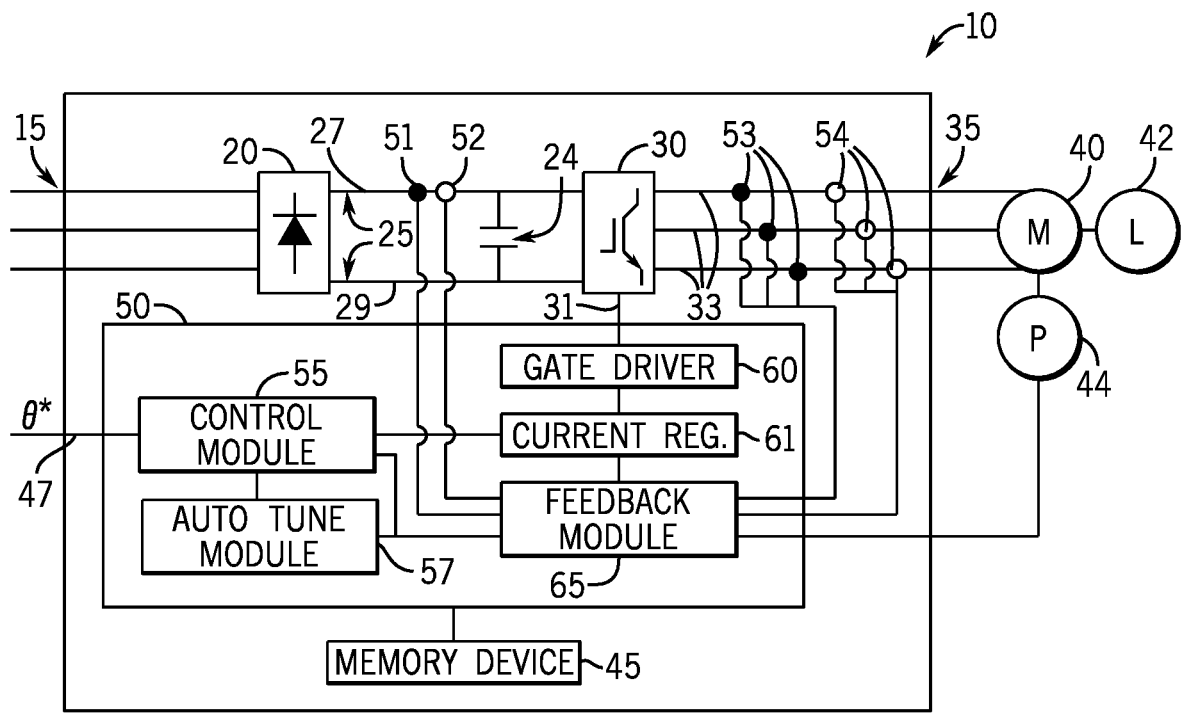
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a motor drive that allows auto tuning of a controller gain while also allowing for an observer to compensate for load dynamics. Historically, one of the values determined by an auto tuning routine is system inertia. The system inertia includes both motor inertia and load inertia and is included in the closed loop control path within the motor drive. Controller gains were determined during the autotuning process which optimized performance of the motor drive according to the auto tuning metrics and as a function of the system inertia. The present invention separates the load inertia from the motor inertia in the controller. The motor inertia remains in the closed loop control path, but the load inertia is moved into an open loop portion of the control path. As a result, the auto tuning routine optimizes performance of the motor drive according to the auto tuning metrics and as a function of the motor inertia.

The load observer and the open loop utilization of the load inertia combine to compensate for load dynamics in the mechanical system. A feed forward acceleration term is multiplied by the load inertia to determine a torque feedforward command. The torque feedforward command provides an initial control effort to compensate for load dynamics. The load observer monitors motor performance and provides still additional compensation for load dynamics. The load observer outputs an estimated value of the motor performance which is utilized by the closed loop controller. The estimated value may be an estimated motor position, an estimated motor velocity, an estimated disturbance torque, and estimated disturbance acceleration, or a combination thereof. The feedforward command provides an initial compensation for expected performance of the mechanical system, and the load observer provides additional compensation for real-time disturbances in the system.

Figure 2:
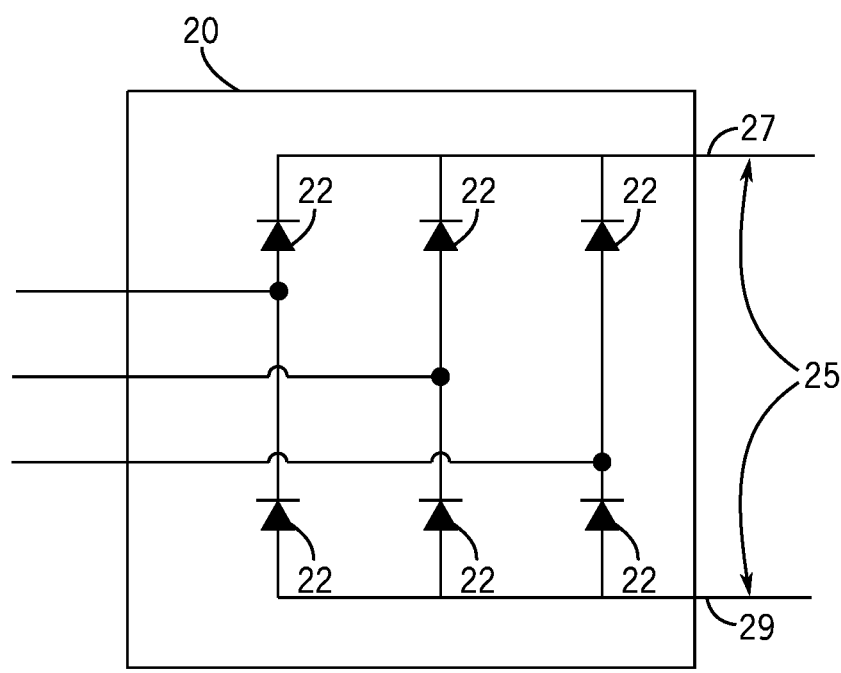
FIG. 2 is a block diagram representation of a rectifier section from the motor drive of FIG. 1.

Turning initially to FIG. 1, a motor drive 10, according to one embodiment of the invention, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. With reference also to FIG. 2, the illustrated rectifier section 20 includes a set of diodes 22 forming a diode bridge that rectifies the three-phase AC voltage to a DC voltage on the DC bus 25. Optionally, the rectifier section 20 may include other solid-state devices including, but not limited to, thyristors, silicon-controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 3:
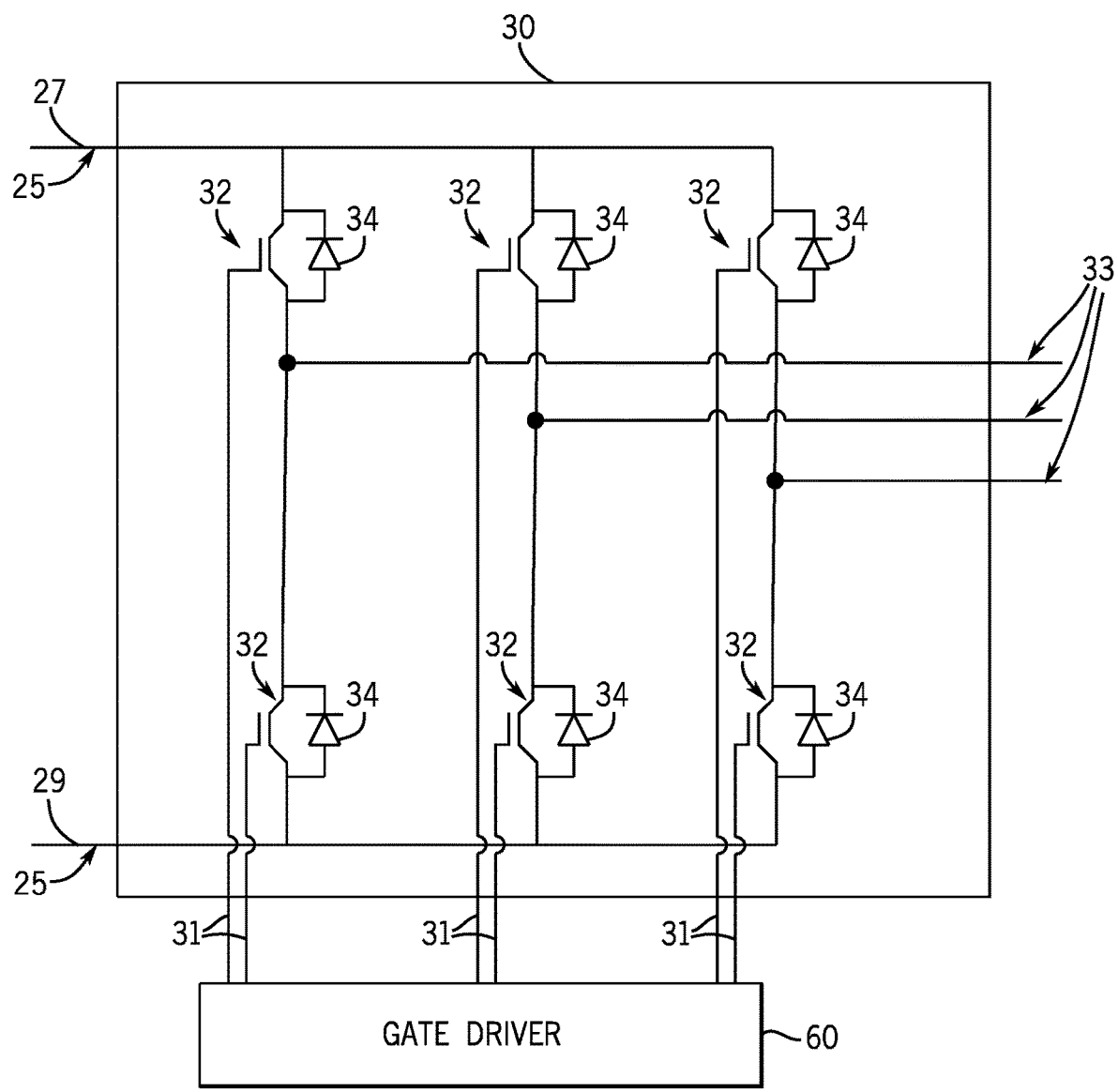
FIG. 3 is a block diagram representation of an inverter section and gate driver module from the motor drive of FIG. 1.

The DC bus 25 is connected in series between the rectifier section 20 and an inverter section 30. Referring also to FIG. 3, the inverter section 30 consists of switching elements, such as transistors, thyristors, or SCRs as is known in the art. The illustrated inverter section 30 includes an insulated gate bipolar transistor (IGBT) 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 is implemented in a control circuit which includes, for example, a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

The controller 50 receives a command signal 47 identifying desired operation of the motor 40 connected to the motor drive 10. The command signal 47 may be, for example, a position command ($\theta^*$), a speed command ($\omega^*$), or a torque command ($T^*$). For a high performance servo control system, the command signal 47 is commonly a position command signal ($\theta^*$). For purposes of discussion herein, the command signal 47 will be the position command signal ($\theta^*$) as shown in FIG. 1. The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. A position feedback device 44 may be connected to the motor 40 and operable to generate a position feedback signal ($\theta$) corresponding to the angular position of the motor 40.

Figure 4:
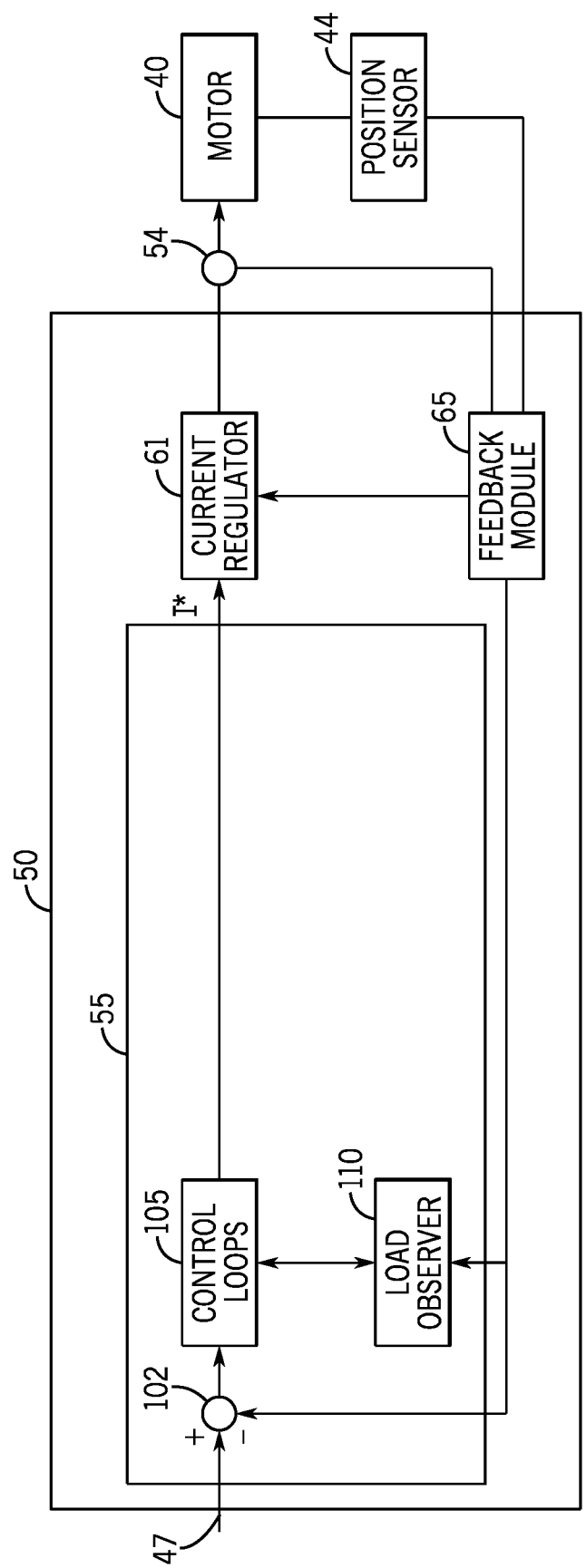
FIG. 4 is a block diagram representation of one embodiment of a control module from the motor drive of FIG. 1.

The controller 50 utilizes the feedback signals and the command signal 47 to control operation of the inverter section 30 to generate an output voltage having a desired magnitude and frequency for the motor 40. The feedback signals are processed by the feedback module 65 and converted, as necessary, to signals for the control module 55. With reference also to FIG. 4, the control module 55 includes control loops 105 to receive an error signal, determined as a difference between the command signal 47 and a feedback signal. The control loops 105 execute responsive to the command signal 47 and the feedback signals to generate a desired reference signal. The control module 55 also includes a load observer 110 to generate one or more estimated values of an operating characteristic of the motor 40 or of a load connected to the motor. As will be discussed in more detail below, the estimated value may be used by a control loop or added to the reference signal output from one of the control loops to generate the desired reference signal. Although not illustrated, one or more filters or gains may be included between the control loops 105 and the current regulator 61 according to an applications requirement.

The output of the control module 55 is a current reference signal provided to the current regulator 61. As is understood in the art, the current regulator 61 may independently regulate a torque producing component of the current and a flux producing component of the current. The current reference signal may include both a torque reference component and a flux reference component. Optionally, the flux reference component may be a fixed value and the current reference signal may consist just of a torque reference component. The current regulator 61 uses the torque reference component and a current feedback signal to output a voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40. As is understood in the art, the current regulator 61 is configured to execute at a bandwidth sufficiently greater than the bandwidth of the control module 55 such that the current regulator 61 may be approximated as a unity gain to the control module 55.

Figure 5:
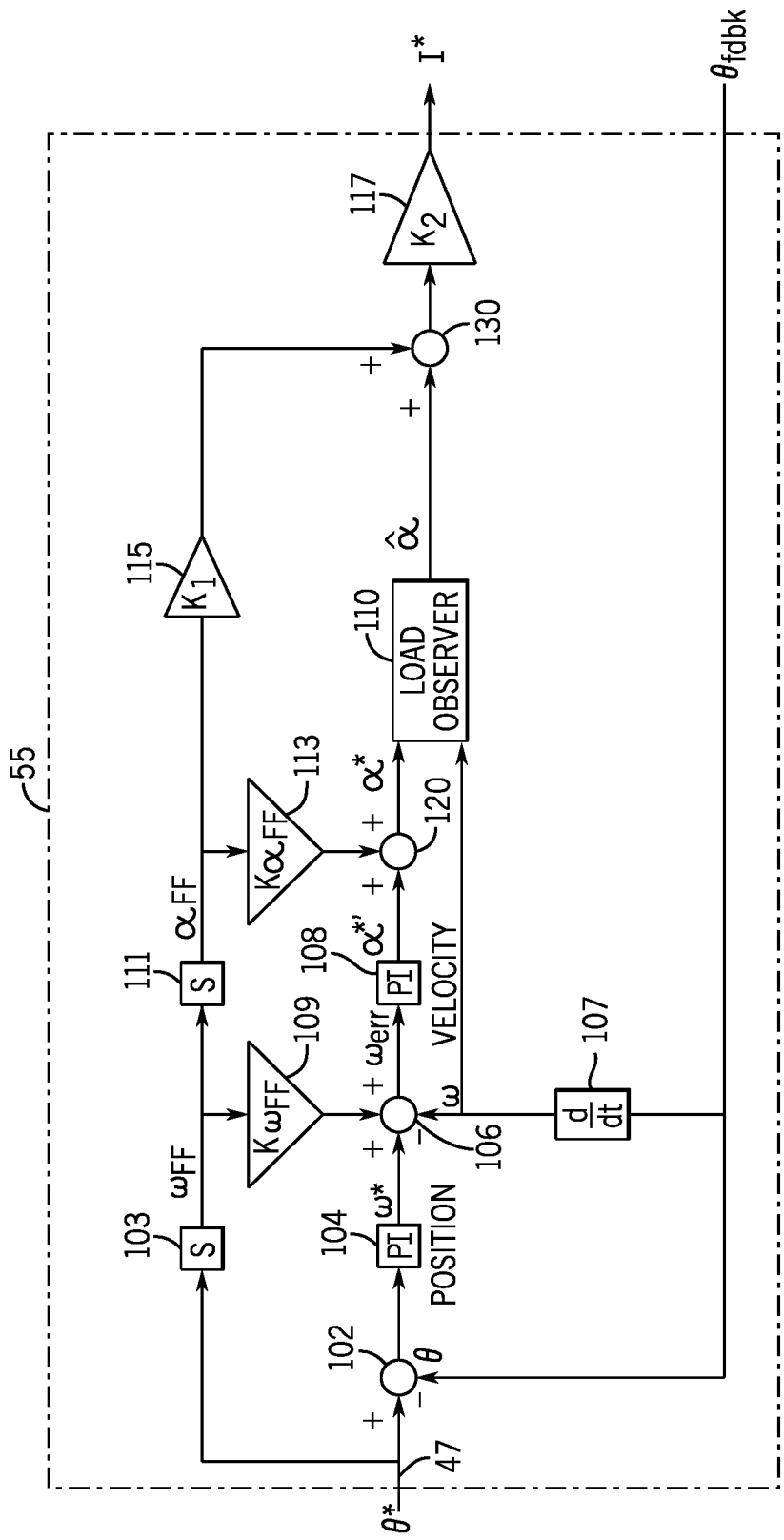
FIG. 5 is a flow diagram of the control module of FIG. 4 according to one embodiment of the invention.

Turning next to FIG. 5, a control module 55 with control loops illustrated according to one embodiment of the invention is shown. The control module 55 receives a position reference signal ($\theta^*$) 47 as an input. The position reference signal ($\theta^*$) is compared to a position feedback signal ($\theta$) at a first summing junction 102. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (I), and/or derivative (D) controllers of the position loop controller 104 includes a controller gain value. The controller gain values are commonly referred to as a proportional gain (Kpp), integral gain (Kpi), and a derivative gain (Kpd). The output of the position loop controller 104 is a velocity reference signal ($\omega^*$).

The velocity reference signal ($\omega^*$) is compared to a velocity feedback signal ($\omega$) at a second summing junction 106. The velocity feedback signal ($\omega$) is output from a derivative block 107 which converts the position feedback signal into the velocity feedback signal. Optionally, the velocity feedback signal ($\omega$) may be an estimated velocity signal generated by the load observer 110. The control module 55 also includes feedforward signals. According to the illustrated embodiment, the position reference signal ($\theta^*$) is passed through a derivative block 103 to generate a velocity feedforward signal ($\omega_{FF}$). The velocity feedforward signal is multiplied by a velocity feedforward gain ($K_{vff}$) 109. The resultant product is also added to the velocity reference signal ($\omega^*$) and the velocity feedback signal ($\omega$) at the second summing junction 106. A velocity error signal ($\omega_{err}$) is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an initial acceleration reference signal ($\alpha^{*'}$).

The initial acceleration reference signal ($\alpha^{*'}$), output from the velocity loop controller 108, is combined with an acceleration feedforward signal ($\alpha_{ff}$) to determine an acceleration reference signal ($\alpha^*$). The acceleration feedforward signal is generated by passing the velocity feed forward signal through a second derivative block 111 and then multiplying the output of the second derivative block 111 by an acceleration feed forward gain ($K_{aff}$) 113. The initial acceleration reference signal ($\alpha^*$') is added to the product resulting from the acceleration feed forward gain at a third summing junction 120. The output of the third summing junction 120 is an acceleration reference signal ($\alpha^*$) which is, in turn, provided as an input to the load observer 110. An output from the load observer 110 provides an estimated disturbance acceleration ($\hat{a}$).

The estimated disturbance acceleration ($\hat{a}$) and the acceleration feedforward signal ($\alpha FF$) are used to generate a current reference signal, I*. With reference still to FIG. 5, a first embodiment of the invention utilizes a first gain, $K_1$, 115 and a second gain, $K_2$, 117 for generation of the current reference signal. The acceleration feedforward signal ($\alpha_{FF}$) is multiplied by the first gain 115 to obtain a first product. The first product is added to the estimated disturbance acceleration ($\hat{a}$) at a fourth summing junction 130. The output of the fourth summing junction is multiplied by the second gain 117 to obtain a second product. In the embodiment illustrated in FIG. 5, the second product is the current reference signal, I*. The first gain, $K_1$, 115 is selected to include a first portion of the total system inertia, and the second gain, $K_2$, 117 is selected to include a second portion of the total system inertia. To facilitate autotuning of the controller gains, it is desirable to separate the load inertia from the motor inertia in the closed loop portion of the control module 55. Thus, the first gain, $K_1$, 115 is selected as a ratio of the load inertia value over the motor inertia value. The second gain, $K_2$, 117 is selected as the motor inertia value divided by a torque constant, Kt, where the torque constant defines a relationship between the torque output by the motor and the current provided to the motor 40. Optionally, the second gain value, $K_2$, 117 may be selected as just the motor inertia value and an additional gain value may be provided which is the inverse of the torque constant value, $K_t$. Multiplying an acceleration reference signal, or acceleration feedforward signal, by an inertial gain converts the acceleration signal into a torque signal. Dividing the torque term by the torque constant, $K_t$, in turn, converts that torque reference signal to the current reference signal, I*, output from the control module 55.

Figure 6:
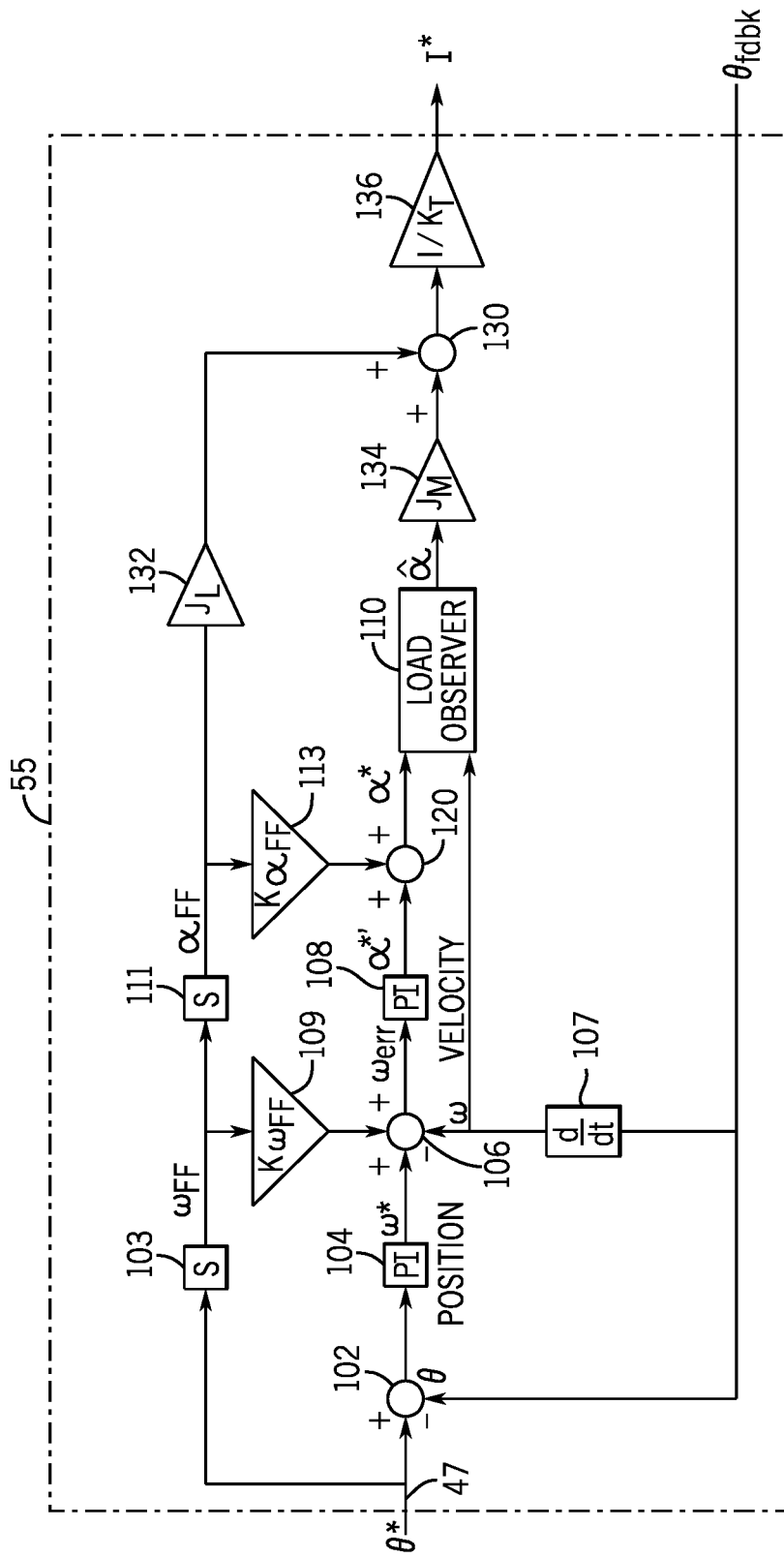
FIG. 6 is a flow diagram of the control module of FIG. 4 according to another embodiment of the invention.

With reference next to FIG. 6, a second embodiment of the invention utilizes a different pair of gains for generation of the current reference signal. Just as with the embodiment illustrated in FIG. 5, it is desirable to separate the load inertia from the motor inertia in the closed loop portion of the control module 55 to facilitate autotuning of the controller gains. Thus, the first gain used in the embodiment illustrated in FIG. 6 is the load inertia value, $J_L$, 132 and the second gain used is the motor inertia value, $J_m$, 134. The acceleration feedforward signal ($\alpha_{FF}$) is multiplied by the load inertia value, $J_L$, 132 to obtain a first product. The estimated disturbance acceleration ($\hat{a}$) is multiplied by the motor inertia value, $J_m$, 134 to obtain a second product. The first and second products are added together at a fourth summing junction 130. Each of the first and second products are torque signals. The output of the fourth summing junction is also, therefore, a torque signal. The output of the fourth summing junction 130 is multiplied by an inverse of the torque constant, $K_t$, to convert that torque reference signal to the current reference signal, I*, output from the control module 55. The embodiments illustrated in FIGS. 5 and 6 illustrate two embodiments of the present invention and are not intended to be limiting. It is understood that the gains may be arranged in different combinations before or after the fourth summing junction 130 while maintaining the load inertia value in the feedforward path and the motor inertia value in the closed loop path.

As discussed above, the control module 55 may include a number of controller gain settings which affect performance of the motor drive 10. The controller gain values need to be adjusted in order to achieve a desired performance level. As shown in FIG. 1, an autotune module 57 is provided to adjust the controller gain values. During an autotuning process, a predefined voltage reference is generated within the motor drive 10. The motor drive 10 controls the inverter section 30 to output the voltage to the motor 40 as defined by the autotuning module 57. Operation of the motor 40 is monitored, for example, by sampling the position feedback signal while the desired voltage is output to the motor 40. Performance of the motor 40 is used to adjust one or more controller gain values in response to the observed performance. Settings for each of the controller gain values are stored in configuration parameters in a non-volatile portion of the memory device 45 to retain the settings when power is removed from the motor drive 10. Typically, the settings are transferred to a volatile portion of the memory device 45 upon applying power to the motor drive 10 to provide for quick reads of the values for use in execution of the control module 55.

In operation, the motor drive 10, according to the various embodiments of the invention, realizes the benefits of auto tuning a motor drive, utilizing a load observer to compensate for system dynamics, and to provide acceleration feedforward without sacrificing performance in one of the other systems. The system inertia includes both a load inertia, $J_L$, and a motor inertia, $J_m$. By separating the load inertia, $J_L$, into a feedforward control path, such as the acceleration feedforward path, and the motor inertia, $J_m$, within the closed loop control path, the effects of each inertia may be compensated for independently, providing improved performance from the motor drive 10.

The motor inertia, $J_m$, is often a known value and may be provided by a motor manufacturer. In some applications, a manufacturer of the motor drive 10 may also manufacture or supply motors 40. The motor drive 10 may include a table of values for motor inertia, $J_m$, according to a selected motor. The known value of motor inertia, $J_m$, facilitates auto tuning to determine a system inertia and, as a result, a value of the load inertia, $J_L$, coupled to the motor 40. The autotuning module sets controller gains within the control module 55 and sets dynamic limits for performance based on the system inertia.

The load inertia, $J_L$, is utilized in the feedforward path of the control module 55. As illustrated in FIG. 6, the load inertia, $J_L$, 132 may be used directly as a gain, multiplied with the acceleration feedforward, OFF. Alternately, the load inertia, $J_L$, may be one element of another gain such as the first gain, $K_1$, 115 as illustrated in FIG. 5. The embodiments illustrated in FIGS. 5 and 6 represent equivalent control circuits with gains arranged differently for ease of description in FIG. 6 and for ease of computation in FIG. 5. After determining controller gains for the position loop controller 104, velocity loop controller 108 and/or the load observer 110, with the autotuning module 57, the closed loop control path should provide stable, desirable control of the motor 40. The load inertia, $J_L$, may be further adapted either manually or automatically without impacting the closed loop control path. In one aspect of the invention, a technician may manually adjust the load inertia value, $J_L$, in real-time during operation of the controlled system via a user interface, such as a keypad on the motor drive 10 or a human-machine interface (HMI) connected to the motor drive 10. Because the load inertia value is applied outside of the closed loop control path, changes to the value do not impact controller gains and controller stability in the closed loop control path. According to another aspect of the invention, the load inertia value, $J_L$, may be adapted automatically. The load inertia value may be further adjusted after determination of the controller gains by the autotuning module 57. Optionally, the load inertia value, $J_L$, may be adapted by the motor drive 10 monitoring feedback signals, desired motion profiles, or other input signals requesting changes to the load inertia value. The separation of the load inertia value, $J_L$, from the closed loop path provides additional flexibility for operation of the motor drive 10.

According to the embodiments illustrated in FIGS. 5 and 6, the acceleration feedforward signal ($\alpha_{FF}$) is determined as a function of the position reference signal, θ*, 47. The position reference signal (θ*) is passed through a first derivative block 103 to generate a velocity feedforward signal ($\alpha_{FF}$), and the velocity feedforward signal is passed through a second derivative block 11 to generate the acceleration feedforward signal ($\alpha_{FF}$). Optionally, a motion profile may be provided to the motor drive 10 in which an external computing device, such as an industrial controller, a programmable logic controller, a motion profile generator, or the like determines values for the position reference signal, velocity feedforward signal, and/or acceleration feedforward signal and transmit each of the reference and feedforward signals as a component in the command signal 47 provided to the motor drive 10. The acceleration feedforward path, multiplied by the load inertia value, $J_L$, provides an initial path by which, at least a portion of the expected disturbance from the load inertia is compensated and by which high bandwidth command tracking is achieved.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of controlling operation of a motor with a motor drive, the method comprising the steps of:
   receiving a position feedback signal at the motor drive from a position sensor operatively connected to the motor;
   receiving a command signal at the motor drive, wherein the command signal defines a desired operation of the motor;
   generating an acceleration feedforward signal with a processor in the motor drive as a function of the command signal;
   generating an acceleration reference signal with the processor as a function of the command signal and of the position feedback signal;
   generating an estimated disturbance acceleration with the processor as a function of the acceleration reference signal and the position feedback signal;
   multiplying the acceleration feedforward signal by a first gain to obtain a first product, wherein the first gain is a function of a load inertia value;
   multiplying the estimated disturbance acceleration by a second gain to obtain a second product;
   summing the first product with the second product to obtain a modified acceleration reference signal; and
   generating an output voltage to control operation of the motor as a function of the modified acceleration reference signal.

2. The method of claim 1, wherein the motor drive includes a load observer and the step of generating the estimated disturbance acceleration is performed by the load observer.

3. The method of claim 2, further comprising the step of executing an autotuning module with the processor, wherein the autotuning module includes the steps of:
   generating a predefined voltage reference to control operation the motor;
   sampling the position feedback signal with the motor drive while generating the predefined voltage reference; and
   determining at least one observer gain for the load observer as a function of the predefined voltage reference and of the position feedback signal sampled while generating the predefined voltage reference.

4. The method of claim 3, wherein the load inertia value is obtained as a function of the predefined voltage reference from the autotuning module and of the position feedback signal sampled while generating the predefined voltage reference.

5. The method of claim 1, wherein the first gain is the load inertia value and the second gain is a motor inertia value.

6. The method of claim 1, wherein the first gain is a ratio of the load inertia value over a motor inertia value and the second gain is a unity gain, the method further comprising the step of multiplying a sum of the first product and the second product by the motor inertia to obtain the modified acceleration reference signal.

7. The method of claim 1, wherein the acceleration feedforward signal is one component of the command signal.

8. A method of controlling operation of a motor with a motor drive, the method comprising the steps of:
   receiving a position feedback signal at the motor drive from a position sensor operatively connected to the motor;
   receiving a command signal at the motor drive, wherein the command signal defines a desired operation of the motor;
   generating an acceleration feedforward signal with a processor in the motor drive as a function of the command signal;
   generating an acceleration reference signal with the processor as a function of the command signal and of the position feedback signal;

generating an estimated disturbance acceleration with the processor as a function of the acceleration reference signal;
multiplying the acceleration feedforward signal by a first gain to obtain a first product, wherein the first gain is a function of a first portion of the system inertia;
multiplying the estimated disturbance acceleration by a second gain to obtain a second product, wherein the second gain is a function of a second portion of the system inertia;
generating a current reference signal as a function of the first product and the second product; and
generating an output voltage to control operation of the motor as a function of the current reference signal.

9. The method of claim 8, wherein the motor drive includes a load observer and the step of generating the estimated disturbance acceleration is performed by the load observer.

10. The method of claim 9, further comprising the step of executing an autotuning module with the processor, wherein the autotuning module includes the steps of:
generating a predefined voltage reference to control operation the motor;
sampling the position feedback signal with the motor drive while generating the predefined voltage reference; and
determining at least one observer gain for the load observer as a function of the predefined voltage reference and of the position feedback signal sampled while generating the predefined voltage reference.

11. The method of claim 8, wherein:
the first portion of the system inertia value is a load inertia value;
the second portion of the system inertia value is a motor inertia value;
the first gain is a ratio of the load inertia value over the motor inertia value;
the first product is added to the estimated disturbance acceleration before multiplying by the second gain; and
the second gain is the motor inertia value divided by a torque constant.

12. The method of claim 8, wherein:
the first gain is a load inertia value;
the second gain is a motor inertia value; and
the current reference is generated by adding the first product to the second product to generate a sum and by dividing the sum by a torque constant.

13. A motor drive, comprising:
a DC bus having a positive rail and a negative rail, wherein the DC bus is operable to receive a DC voltage between the positive rail and the negative rail;
an inverter section having a plurality of switching elements, wherein each switching element is controlled by a gating signal and wherein the inverter section is operable to receive the DC voltage from the DC bus and provide an AC voltage at an output of the motor drive;
a memory device operable to store a plurality of instructions and a plurality of configuration parameters;
a first input configured to receive a command signal corresponding to desired operation of a motor connected to the motor drive;
a second input configured to receive a position feedback signal corresponding to an angular position of the motor connected to the output of the motor drive;
a controller operable to execute the plurality of instructions to:
sample the position feedback signal,
generate an acceleration feedforward signal as a function of the command signal,
generate an acceleration reference signal as a function of the command signal and of the position feedback signal,
generate an estimated disturbance acceleration as a function of the acceleration reference and the position feedback signal,
multiply the acceleration feedforward signal by a first gain to obtain a first product, wherein the first gain is a function of a load inertia value,
multiply the estimated disturbance acceleration by a second gain to obtain a second product, wherein the second gain is a function of a motor inertia value, and
sum the first product with the second product to obtain a modified acceleration reference signal; and
a gate driver module operable to generate the gating signal for each of the plurality of switching elements in the inverter section as a function of the modified acceleration reference signal from the controller.

14. The motor drive of claim 13, wherein the configuration parameters include a motor inertia value corresponding to an unloaded state of the motor.

15. The motor drive of claim 13, wherein the controller is further operable to execute a load observer and the estimated disturbance acceleration is an output from the load observer.

16. The motor drive of claim 15, wherein the controller is further operable to execute an autotuning module to:
generate a predefined voltage reference to control operation the motor;
sample the position feedback signal while generating the predefined voltage reference; and
determine at least one observer gain for the load observer as a function of the predefined voltage reference and of the position feedback signal sampled while generating the predefined voltage reference.

17. The motor drive of claim 16, wherein the load inertia value is determined as a function of the predefined voltage reference from the autotuning module and of the position feedback signal sampled while generating the predefined voltage reference.

18. The motor drive of claim 13, wherein the first gain is the load inertia value and the second gain is the motor inertia value.

19. The motor drive of claim 13, wherein the first gain is a ratio of the load inertia over the motor inertia and the second gain is a unity gain, and wherein the controller multiplies a sum of the first product and the second product by the motor inertia to obtain the modified acceleration reference signal.

20. The motor drive of claim 13, wherein the acceleration feedforward signal is one component of the command signal.

* * * * *